(12) United States Patent
Singh et al.

(10) Patent No.: US 10,853,466 B2
(45) Date of Patent: Dec. 1, 2020

(54) PORTABLE KEYS FOR MANAGING ACCESS TO MOBILE DEVICES

(71) Applicant: Hyla, Inc., Farmers Branch, TX (US)

(72) Inventors: Bikramjit Singh, Carlsbad, CA (US); Rebekah Jane Griffiths, North Tustin, CA (US); Rajiv Kumar Dwivedi, Bartlett, IL (US); Karl Felix Medina, Oceanside, CA (US)

(73) Assignee: Hyla, Inc., Farmers Branch, TX (US)

( * ) Notice: Subject to any disclaimer, the term of this patent is extended or adjusted under 35 U.S.C. 154(b) by 145 days.

(21) Appl. No.: 15/916,246

(22) Filed: Mar. 8, 2018

(65) Prior Publication Data

US 2018/0260554 A1    Sep. 13, 2018

Related U.S. Application Data

(60) Provisional application No. 62/468,924, filed on Mar. 8, 2017.

(51) Int. Cl.
*H04L 9/00* (2006.01)
*G06F 21/34* (2013.01)

(52) U.S. Cl.
CPC .................................. *G06F 21/34* (2013.01)

(58) Field of Classification Search
CPC ....................................................... G06F 21/34
USPC ........................................................... 726/20
See application file for complete search history.

(56) References Cited

U.S. PATENT DOCUMENTS

| | | | |
|---|---|---|---|
| 8,195,511 B2 | 6/2012 | Bowles et al. | |
| 2006/0178933 A1 | 8/2006 | FitzGerald et al. | |
| 2006/0256725 A1* | 11/2006 | Engel | H04M 1/24 370/241 |
| 2010/0100229 A1 | 4/2010 | Whitson et al. | |
| 2010/0161397 A1 | 6/2010 | Gauthier et al. | |
| 2010/0228676 A1 | 9/2010 | Librizzi et al. | |
| 2011/0060945 A1 | 3/2011 | Leprince et al. | |
| 2012/0029947 A1 | 2/2012 | Wooldridge et al. | |
| 2012/0259833 A1 | 10/2012 | Paduroiu | |
| 2013/0132175 A1 | 5/2013 | Claessen et al. | |
| 2013/0188890 A1* | 7/2013 | Naor | B65D 83/08 383/71 |
| 2013/0246211 A1 | 9/2013 | Sullivan | |
| 2013/0246212 A1 | 9/2013 | Sullivan | |
| 2014/0187207 A1* | 7/2014 | Slack | G06F 9/4843 455/411 |
| 2015/0120485 A1* | 4/2015 | Nash | H04M 1/24 705/26.4 |
| 2016/0315652 A1* | 10/2016 | Tabatabai | H04M 1/03 |

(Continued)

OTHER PUBLICATIONS

Weiss, H. E., "Hello Totem get Cash for your Old Cell Phones Fast", Jun. 19, 2012 (4 pages).

(Continued)

*Primary Examiner* — Christopher J Brown
(74) *Attorney, Agent, or Firm* — Ferguson Braswell Fraser Kubasta PC

(57) ABSTRACT

In various implementations, a key may be provided. The key may be portable to facilitate use and reduce costs. The key may include a connector and a housing. The connector may allow direct coupling of the key with a mobile device. Once the connector is directly coupled to a mobile device, the key may perform tests or other commands from a server and/or lock the mobile device.

18 Claims, 8 Drawing Sheets

(56) References Cited

U.S. PATENT DOCUMENTS

2016/0342560 A1* 11/2016 Hulbert ................ G06F 3/0219
2017/0110898 A1* 4/2017 Kyriakoulis .......... H02J 7/0042

OTHER PUBLICATIONS

Quraishi, J., "What Happens to Your Phone When you Recycle It?", Nov. 15, 2010 (4 pages).

Kelley Blue Book, "Q: What is Trade-in Value?", retrieved Jul. 20, 2016, Published Dec. 17, 2013 (2 pages).

International Search Report and Written Opinion for PCT/US2015/011199, dated Apr. 9, 2015 (9 pages).

Weiss, Helmut, "Hello Totem get Cash for your Old Cell Phones Fast.Free Quote"; <http://hellototemreviewbuyback-cellphones.blogspot.com/2012/06/hellototem-buyback-cellphones-option.html>; Jun. 19, 2012 (4 pages).

Quraishi, Jen, What Happens to Your Phone When You Recycle It?; <https://www.motherjones.com/politics/2010/11/what-happens-your-phone-when-you-recycle-it/>; Nov. 15, 2010 (4 pages).

Alec, "Can I install this iPhone 5s home button on my iPhone 5?"; <https://www.ifixit.com/Answers/View/185840/Can+I+install+this+iPhone+5s+home+button+on+my+iPhone+5>; Posted Aug. 10, 2014 (3 pages).

Kelly Blue Book, "Q: What is Trade-In Value?"; <https://www.kbb.com/what-is/trade-in-value/>; Dec. 17, 2013 (2 pages).

PCT/US2015/011199 International Search Report and Written Opinion dated Apr. 9, 2015 (8 pages).

* cited by examiner

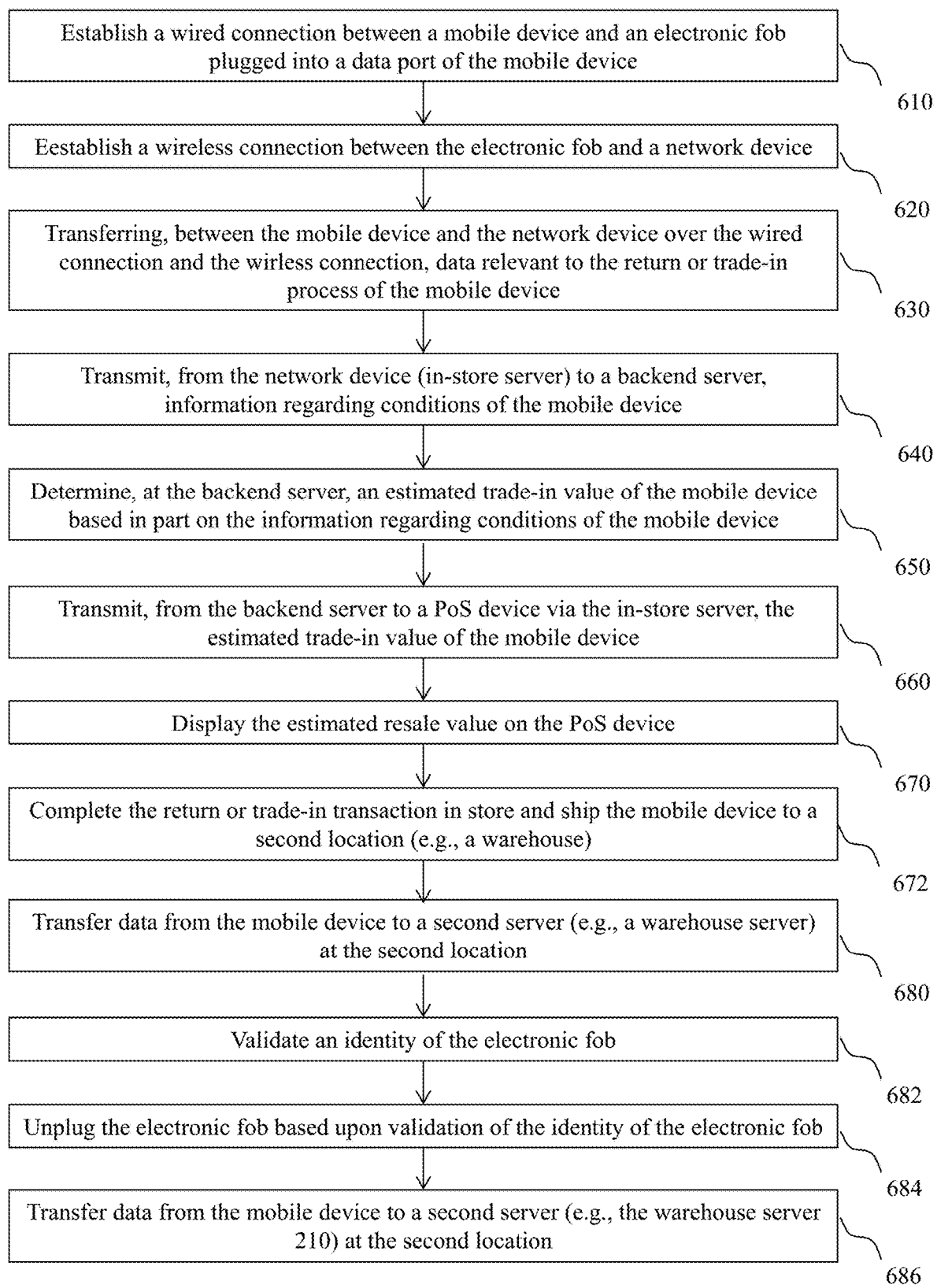

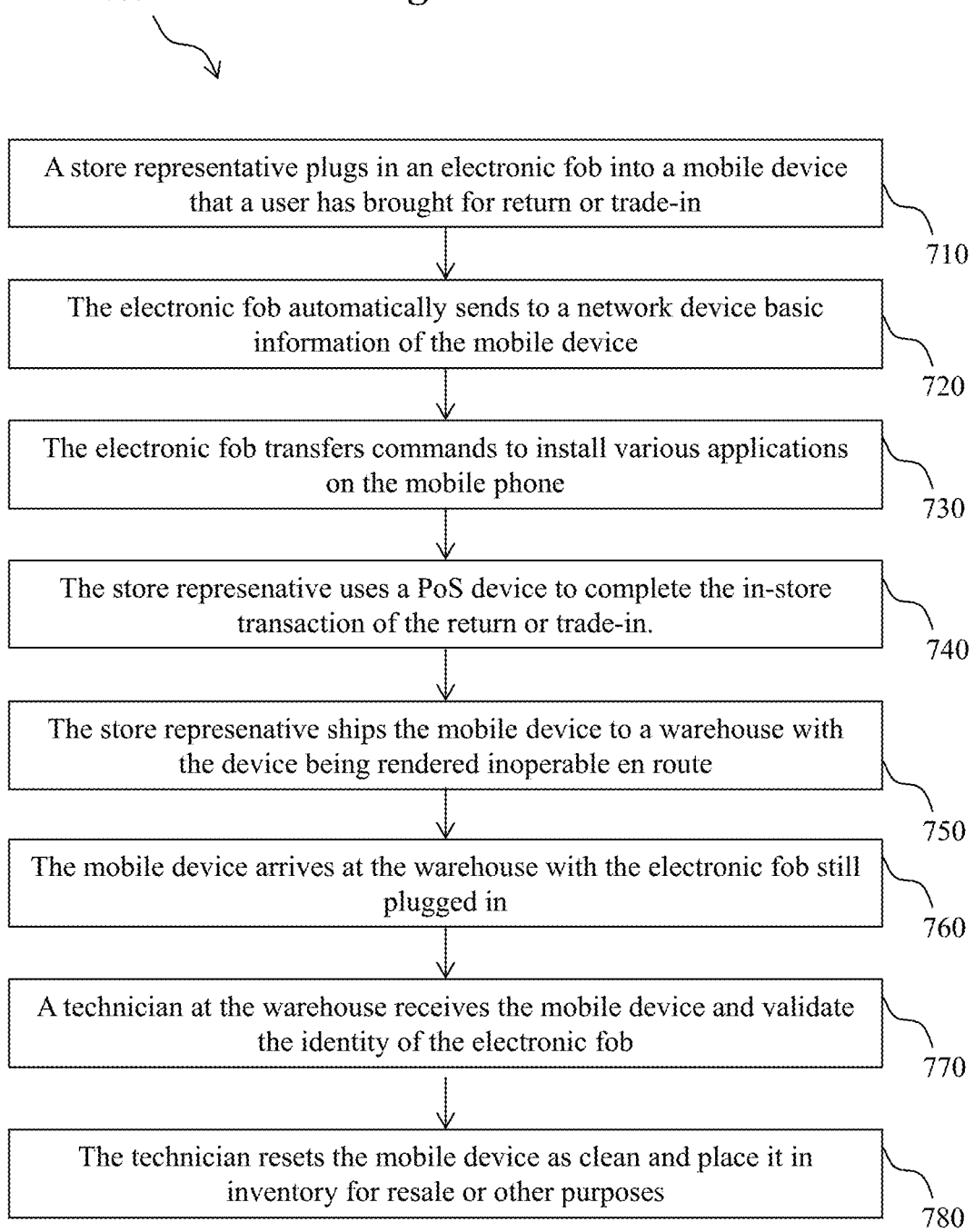

PORTABLE KEYS FOR MANAGING ACCESS TO MOBILE DEVICES

CROSS-REFERENCE TO RELATED APPLICATION

This application claims the benefit of U.S. Provisional Patent Application No. 62/468,924 entitled "PORTABLE KEYS FOR MANAGING ACCESS TO MOBILE DEVICES" and filed on Mar. 8, 2017, and which is hereby incorporated by reference for all purposes.

TECHNICAL FIELD

The present disclosure relates generally to keys to at least partially manage access mobile devices.

BACKGROUND

Millions of mobile devices are sold annually. Consumers with business needs and/or financial means regularly upgrade or change their mobile devices as technology advances. As a result, used mobile devices are often returned or traded in and then repurposed for use by other users or for extracting components to be used in other electronic devices. Thus, it becomes important to efficiently and securely manage the used mobile devices during the return or trade-in process.

Currently, determining and managing mobile devices conditions during trade-in may require many steps involving different types of automated or manual solutions. Consequently, the process may be inefficient, error-prone, and difficult to scale up and down based on demand. For example, device evaluation may require different activities, each of which when done manually can lead to errors in evaluation. Such errors may include, for instance, activation lock mismatches, forgotten lock disablements, improper diagnosis of physical (e.g., external and/or internal) conditions of the mobile device, and incorrect value assessment or associated user credit. Sometimes these errors lead to inflated trade-in values, thereby causing loss to the trade-in operator. Even when performed correctly, the required steps may be cumbersome, e.g., increasing a user's time in a trade-in store. Additionally, ineffective tracking of mobile devices can lead to theft, loss, and/or mismatched devices and corresponding valuations.

SUMMARY

In various implementations, a key may be provided. The key may be portable to facilitate use and reduce costs. The key may be reusable. The key may include a connector and a housing. The housing of the key may include memory, processor(s), power source(s), and/or a communication interface. The connector may allow direct coupling (e.g., wired connection) of the key with a device (e.g., electronic devices, such as a mobile device, laptop, etc.). The connector may include an adapter (e.g., dongle, integrated adapter, etc.) to directly couple with the mobile device. The adapter may allow coupling of the key with via a different type of connection than the key without the adapter (e.g., the adapter may couple via audio jack and the key may couple via USB-C). Once the connector is directly coupled to a device (e.g., mobile device), the key may perform tests or other commands from a server and/or lock the mobile device. For example, the key may be capable of retrieving data from a device coupled to the key and/or transmitting at least a portion of the received data (e.g., to a warehouse server).

In various implementations, the key may facilitate receipt and/or tracking of devices, such as mobile devices. For example, a key may be coupled to a device (e.g., mobile device) by coupling a connector of the key to a connector of the device. In some implementations, the connector may be a male connector inserted into a port of the mobile device. The key may be communicably coupled to a warehouse server. Instructions to perform one or more operations may be transmitted to the mobile device and mobile device information may be received based on the performance of one or more of the operations.

In various implementations, a portable key may include a housing and one or more connectors. The housing may include a first communication interface, a processor, and a power source. The first communication interface may communicate with a warehouse server. The processor may be adapted to (e.g., perform operations in a module to) retrieve data from a mobile device coupled to the key and transmit at least a portion of the received data to the warehouse server. The processor may be adapted to perform test(s). Tests may include tests that cause the mobile device to perform an operation (e.g., as a portion of the test, such as display perform a command, attempt to transmit a message, attempt to connect to a wireless signal, display an image, etc.). The results of the operation may be determined (e.g., results may be received based on the performance of one or more of the tests) and at least a portion of the results may be transmitted to the warehouse server. A power source of the key may provide power to one or more components of the housing and/or to the mobile device. A connector may directly couple with a port of a mobile device (e.g., to communicate with the mobile device and/or lock the mobile device).

In various implementations, the key may be used to facilitate receipt of a mobile device (e.g., for resale and/or repair), to determine a value of mobile device, to validate and/or process a claim of insurance, to validate and/or process a warranty of the device, and/or for any other appropriate operation. A mobile device and a portable key may be coupled by inserting a connector (e.g., female connector) of the portable key into a connector (e.g., port) of the mobile device. In some implementations, an adapted may be utilized to couple the mobile device and the portable key. The key and the warehouse server may be communicably coupled. Instructions may be transmitted to the mobile device via key (e.g., the coupling between the connector of the portable key and the port of the mobile device) to cause one or more operations to be performed on the mobile device. The operations may be stored in a memory of the portable key and/or retrieved from a remote server (e.g., the warehouse server, a cloud server, etc.). Mobile device information may be retrieved from the mobile device based on the operations (e.g., requested by a processor of the portable key). The information retrieved may include device information and/or results of testing (e.g., performed by the portable key and/or performed by the mobile device based on instructions provided by the key).

In various implementations, system (e.g., backend server) may include a server and a database. The server may track activities of a mobile device during a return and/or trade-in process of the mobile device by retrieving data from the mobile device for a plurality of times at a plurality of locations including at a store and at a warehouse. The database may store data retrieved from the mobile device and/or location information determined during tracking activities. Retrieving the data from the mobile device may include using a portable key attached to the mobile device at the store via a wired connection. The portable key may include a processor adapted to perform operations, such as: retrieving data from a mobile device coupled to the key, transmitting at least a portion of the received data to the server, performing test(s) that may cause the mobile device to perform operation(s), and/or receiving results of the operation(s) performed in the test(s). At least a portion of the results from the tests and/or retrieved mobile date may be transmitted to the server by the key. The portable key may remain attached to the mobile device during transit from the store to the warehouse.

The details of one or more implementations are set forth in the accompanying drawings and the description below. Other features, objects, and advantages of the implementations will be apparent from the description and drawings.

BRIEF DESCRIPTION OF THE DRAWINGS

For a more complete understanding of the present disclosure and its advantages, reference is now made to the following description taken in conjunction with the accompanying drawings, in which:

FIG. 6 illustrates an implementation of an example implementation of a process for returning or trading in a mobile device; and FIG. 7 illustrates an implementation of an example implementation of a process for returning or trading in a mobile device.

Like reference symbols in the various drawings indicate like elements.

DETAILED DESCRIPTION

Figure 1A:
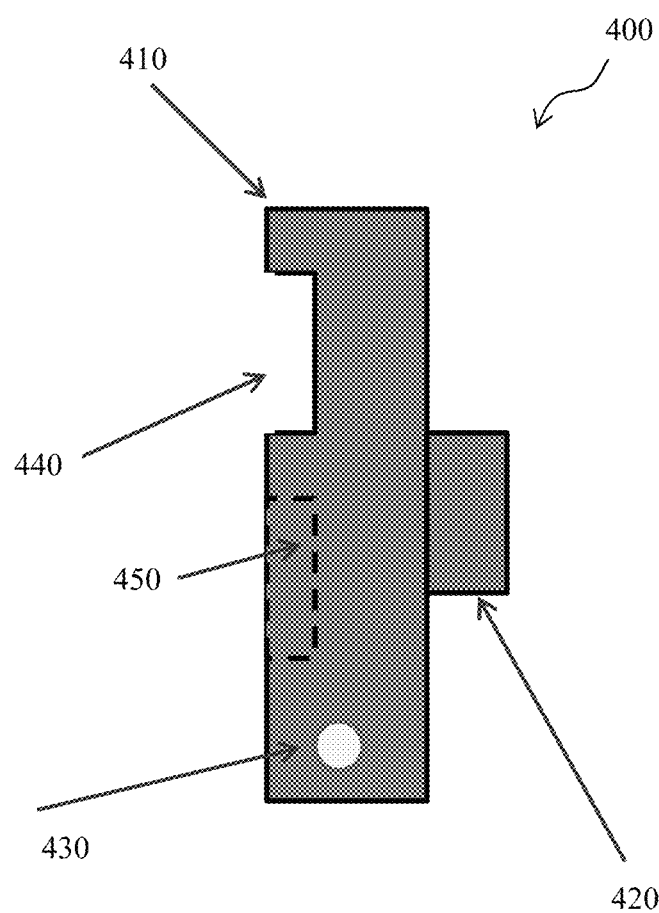
FIG. 1A illustrates an implementation of an example implementation of a portable key.

In various implementations, the portable key may be a physical key that when directly coupled to a device may be utilized to manage access to the coupled mobile device. For example, the physical key may allow data on the device (e.g., mobile device) to be accessed, request operations be performed on the device, may receive data (e.g., test results) from the device, lock (e.g., physical and/or virtual) the coupled device, and/or any other appropriate operation. In some implementations, the portable key may be communicably coupled (e.g., via WiFi, LTE, etc.) to a warehouse server. The warehouse server may transmit instructions to the portable key (e.g., to test a coupled device) and/or receive information from the portable key. By utilizing the portable key, access to a coupled device may be managed while obtaining information useful to a user and/or the warehouse server (e.g., for confirmation of identity of the mobile device, for physical protection, for recycling information, for tracking, for trade-in value determination, etc.).

In various implementations, a portable key may be a physical device. The portable key may include a housing and at least one connector extending from the housing. The housing may be any appropriate size and/or shape. For example, the housing may have an oval and/or rectangular cross-section along a length of the housing.

In some implementations, the portable key may have a length less than the size of a mobile phone, less than approximately 5 inches, and/or less than approximately 3 inches, in some implementations. The size of the housing may allow the portable key to be easily portable by a user. User satisfaction may be increase by coupling the mobile device to the key rather than coupling the mobile device to a kiosk or computer (e.g., for operations such as verification of device, testing, tracking, downloading applications, etc.) since a portable key may be easier to use, store, and/or operate.

The connector of the housing may be any appropriate connector that allows physical coupling between the portable key and a mobile device. The connector may allow data transfer between the portable key and a coupled mobile device. For example, the connector may include a lighting plug, a USB connector (e.g., mini, micro, or any other appropriate USB connector), a HDMI connector (e.g. a mini HDMI or any other appropriate HDMI connector), a multiplug connector, a single plug connector, magnetic connector, any appropriate other connector, and/or combinations thereof. The connector may be a male connector or a female connector. The connector may include more than one connector (e.g., one or more male and/or female connectors). For example, the connector of the key may couple with a connector of the device. In some implementations, the connector of the key may include a male connector that is inserted into a port (e.g., connector) of the device. The key may include at least one female connector to which a standard cable (e.g., micro USB, lightning cable, etc.) can be coupled and the cable may be coupled (e.g., via a male connector) to the mobile device (e.g., a port of the mobile device), in some implementations.

Utilizing a physical connection between the portable key and the mobile device may facilitate processing of the mobile device. For example, access to restricted device information may be allowed via physical connections while disallowed by wireless connections (e.g., access may be restricted by native applications, such as an operating system, on the mobile device). For example, if the mobile device is installed with a particular operating system (e.g., iOS commercially available from Apple), the particular operating system may not allow apps, either resident on the mobile device or on a remote memory, connected over a wireless interface of the mobile device to have restricted privileges for command, control, and/or information retrieval from the mobile device. For example, a device identification code, such as an IMEI number may not be accessible via wireless connections. However, some of the restricted information may be useful to the processing of the mobile device (e.g., to verify the device identity, to detect usage information, service information, and/or any other appropriate information) and so a physical connection may be utilized to automatically obtain at least a portion of this restricted information. Therefore, the portable key may be able to obtain more information than would be obtained via an app or wireless connection to the mobile device. The ability to retrieve data from the mobile device rather than via user entry may decrease errors (e.g., due to human error and/or forgery) and/or increase accessibility to operations such as trade-in. For example, utilizing the portable key to perform operations (e.g., download applications, retrieve information, and/or transfer information) may provide accessibility of the operations to physically disabled users since the key may perform operations that a physically disabled user may have difficulty performing. As another example, by providing a key that performs operations, such as determining trade-in value, rather than users providing information, more users may trade-in mobile devices which may increase the quantity and quality of mobile devices in the resale market (e.g., which may be beneficial to users and mobile device resellers).

In some implementations, the portable key may be able to obtain access to higher privilege information and/or have the ability to perform more operations that an application on the device or coupled wirelessly to the device would not be able. The ability to access restricted information (e.g., higher privileged information) may allow access to device information useful to the trade-in calculations. For example, device identification numbers (e.g., IMEI) may be obtained via a physical connected key and may be used to verify the identify of a device, access service records (e.g., to identify previous repairs or failure to repair problems), age, etc. The ability to perform operations that would be restricted by applications on the device and/or wirelessly requested may facilitate and/or improve (e.g., when compared to calculations that do not include this information and/or test results) trade-in calculations. For example, the information may be included as a deduction and/or increase in base line trade in value (e.g., obtained from data of historical and/or current sales and/or purchase prices).

The portable key may include a variety of other components at least partially disposed in the housing of the portable key. For example, the portable key may include a memory (e.g., to store modules that include operations such as retrieval protocols for specific mobile devices, communication protocols, key operations, and/or testing protocols; device information; and/or test results), processor to perform operations of a module, power supply (e.g., to provide power to components of the portable key and/or mobile device), additional communication interfaces (e.g., to communicate with other mobile devices and/or a warehouse server), and/or indicators (e.g., LED lights to provide notifications). The portable key may include a processor capable of executing modules (e.g., stored in the memory, retrieved from a server, and/or transmitted from a server such as the warehouse server) to perform operations. For example, the memory of the portable key may store one or more operations, information received from the mobile device (e.g., device information and/or test results), and/or other information. In some implementations, the key may be capable of retrieving an application from a memory, loading the application on the device (e.g., a return application, a trade in application, an insurance claim application, etc.), and/or processing information obtained from the device (e.g., to calculate a trade in value, assess condition of the device, at least partially process warranty claims, and/or any other appropriate processing). For example, a return app such as the example return application described in U.S. patent application Ser. No. 15/452,707 may be loaded onto the device and/or operations of the return app may be performed by the key (e.g., instructions may be stored in a memory of the key and performed by the processor of the key). In some implementations, trade in value applications, such as the example trade in value application described in U.S. patent application Ser. No. 14/519,657 may be loaded onto the device and/or one or more operations of the trade-in value app may be performed by the key (e.g., instructions may be stored in a memory of the key and performed by the processor of the key). For example, information may be retrieved from a mobile device, information may be received from a server (e.g., repair rates, online reviews, delays in replacement parts, future valuation, etc.), and a trade in value for the device may be determined.

The processor of the portable key may perform operations (e.g., of modules) stored in the memory and/or received from the warehouse server communicably coupled to the portable key. For example, operations may include requesting device information; requesting device location, retrieving and/or receiving device information (e.g., device identification codes, usage information, user information, service provider information, repair information, and/or any other appropriate information at least partially available from the device and/or using information on the device); requesting the mobile device to perform tests (e.g., tests to evaluate condition of the device and/or components thereof, such as the tests described in U.S. patent application Ser. No. 15/452,707), communicating with the mobile device via the connector; communicating with the warehouse server via a communication interface; communicate with one or more other mobile devices via a connector and/or other communication interface; restoring a mobile device from data retrieved from another mobile device; storing information (e.g., device information, instructions for communicating with mobile devices, test results, etc.); erasing data from a mobile device; and/or other appropriate information.

The portable key may include any appropriate communication interface(s). For example, in addition to the connector to couple the portable key with a mobile device, the portable key may include a communication interface that allows wireless communication (e.g., with the warehouse server and/or other devices). The communication interface may allow the key to be communicably coupled to the warehouse server, other devices (e.g., web-based servers), and/or other repositories.

In some implementations, the portable key may include be equipped with tracking components such as but not limited to, global positioning system (GPS) antennas, or may use tracking functions of the device. For example, the mobile device may be capable of providing a location of the device (e.g., provided by the user for example, in contact information, via GPS, via cellular tower triangulation, via indicators such as sound and/or lights, etc.) and/or an approximately location of the device (e.g., via cell phone triangulation, coupling to wireless networks, etc.). The portable key may access the capabilities of the mobile device to determine its location, request determination of the mobile device location, perform one or more operations based on the location information (e.g., identify a trade-in site, determine local value, determine local repair costs, etc.) and/or transmit the determined location to the warehouse server.

In some implementations, the portable key may include one or more indicators. The indicators may provide visual, audio, and/or tactile notifications. For example, the indicators may include LED lights. The indicators may indicate when operations are being performed such as, receiving information, transmitting information, saving information, charging, and/or any other appropriate operation. For example, when operations are being performed the indicator may light in a first color, when operations are completed successfully an indicator may light in a second color, when operations encounter errors indicators may light in a third color, etc. In some implementations, the indicators may include lights that flash in predetermined colors and/or patterns to indicate an operation (e.g., commencement, completion, performance, and/or errors in performance). In some implementations, indicator(s) may be utilized to facilitate device location determinations and/or tracking. For example, the server may transmit operations to cause the key coupled to a device to be activated (e.g., audio and/or visual indicators). The activation of the indicator may facilitate locating a lost or stolen device and/or verify that an electronic record corresponds with a device.

The portable key may include a screen protector, in some implementations. The screen protector may cover the screen of the mobile device. The screen protector may be rigid, partially flexible, and/or flexible. The screen protector may inhibit damage to the screen and/or other portion(s) of the mobile device such as scratching, cracking (e.g., fall protection), bruising, chipping, etc. Thus damage to during transport may be reduced (e.g., when compared with transport without an attached screen protector), in some implementations. The screen protector may inhibit access to the screen of the device and thus the mobile device. Thus, the screen protector may be a physical lock on the mobile device. When the screen protector is engaged (e.g., coupled to the mobile device or a portion thereof), the mobile device may be locked (e.g., since the touch screen may not be operable with the screen protector engaged). For example, since screen access by users is inhibited, theft of data during transport may be inhibited when the device is locked.

The portable key may be disposable and/or reusable, in some implementations. A reusable, portable key may be recirculated into a supply chain as part of shipping kits for a store and/or individual user. In some implementations, the portable key manufacturing cost may be low such that reuse is not economically advantageous (e.g., resetting the key may cost more than a new device). In some implementations, the portable key may be single use. For example, to unlock the portable key from the device may damage the device (e.g., the portable key may include a tab that clamps the mobile device to the screen protector and the tab is broken to unlock the device from the key).

The portable key may have a ruggedized and physical lockable industrial design, in some implementations. For example, the portable key may be shock resistant, water resistant, water proof, etc. The portable key (e.g., screen protector) may be capable of protecting the key (e.g., information on the key) and/or the device. In some implementations, the key may include components that resist damage during shipping and/or when dropped. For example, memory such as flash memory that is more stable during dropping and/or moving may be utilized. A power source that is capable of air transport and/or approved for air transport by an appropriate agency (e.g., US Federal Aviation Agency) may be utilized (e.g., to inhibit ignition of the key and/or device). A connector that is capable of maintaining a connection to the coupled device may be utilized. For example, the connector may be reinforced such that the connector is inhibited from breaking off the key while remaining in the connector of the coupled device when the key and coupled device are dropped.

The portable key may be designed to have simple steps of secure reset, turn-on, tracking for multi-use purposes. For example, the portable key may include one or more activators (e.g., lever, switch, button and/or combinations thereof) that when activated resets the key, turns-on the key, and/or performs any other appropriate operation. For example, the housing may include a switch and/or button that when activated wipes data from the coupled mobile device. In some implementations, activation of an activator may cause testing to be performed on the coupled mobile device and/or mobile device data to be retrieved.

In some implementations, the portable key may be resettable (e.g., mobile data received for a specific mobile device may be erased for the next use). In some implementations, the portable key may transmit a request to the mobile device to wipe at least a portion of the data on the mobile device (e.g., personal data, all data, portions of the data, return to factory default, etc.). In some implementations, the warehouse server may communicate with the key to wipe (e.g., erase) data remotely (e.g., of a lost and/or stolen device).

FIG. 1A illustrates an implementation of an example portable key 400. The portable key 400 may be an electronic device designed with any suitable shape, material, hardware and/or software. The portable key 400 may comprise a housing 410, a first communication interface 420 (e.g., a connector), an indicator 430, a second communication interface 440, and a battery 450. The second communication interface may include a port that allows charging and/or data transfer. The housing 410 may provide a surface on which a mobile device may rest, in some implementations. For example, the housing may have a shape similar to a device cradle. The housing may support the weight of the device coupled to the key such that the device may rest on the housing when coupled. In some implementations, the housing 410 may have a shape that allows the mobile device to rest in a predetermined position after the mobile device is connected to the portable key 400.

Figure 1B:
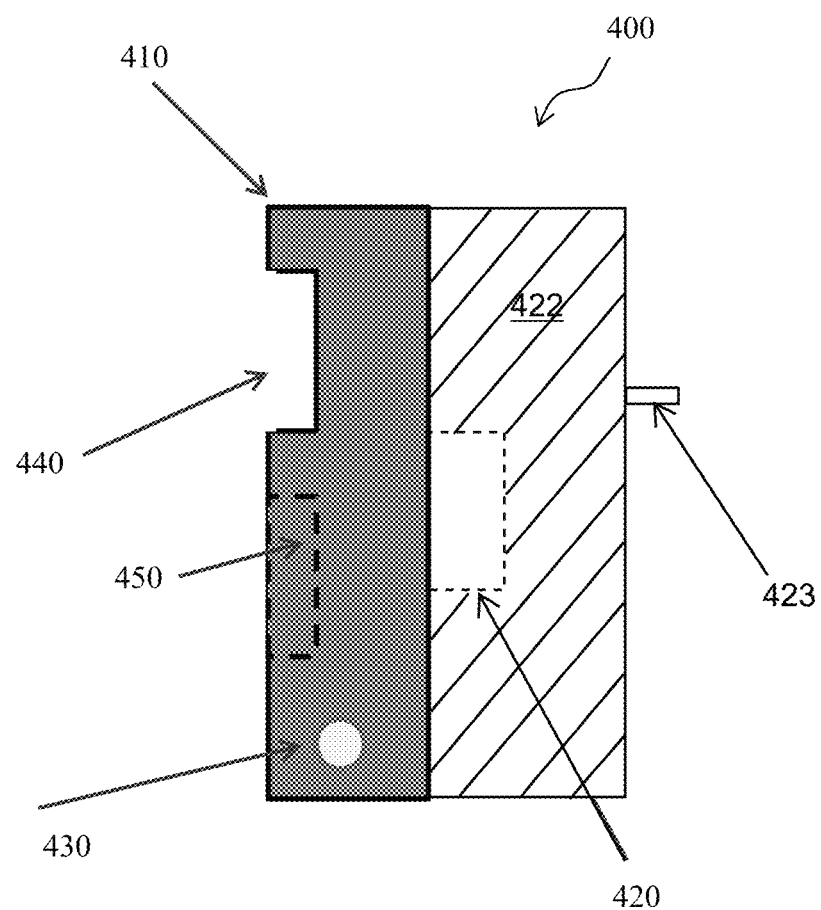
FIG. 1B illustrates an implementation of an example implementation of a portable key.

In some implementations, the connector may include an adapter. As illustrated in FIG. 1B, in some implementations, an adapter 422 may be coupled to the key 400. For example, the first communication interface 420 may be received by a receiving member of the adapter 422. The adapter 422 and the key 400 may be coupled such that the second communication interface 423 of the adapter 422 and the first communication interface 430 are communicably coupled (e.g., via a wired connection, such as connections utilized in dongles and/or other types of adapters). The second communication interface 423 may couple with a mobile device such that the key and the mobile device are directly and communicably coupled. The use of an adapter may allow use of a key with a variety of different mobile devices since an adapter may be utilized to change the type of connection (e.g., USB-C to lightening connection, USB-C to audio jack, etc.). As illustrated, the adapter may have a similar housing, which may increase aesthetics of the device to users. The adapter may not include a housing with a similar profile to the housing of the key, in some implementations.

In some implementations, the adapter may include a cable. A cable may include connectors that couple with the first connector of the key and with the connector (e.g., port) of the mobile device. Thus, a mobile device and key may be coupled via the cable adapter such that the key may perform various operations (e.g., retrieve data, perform tests, and/or transmit information related to the mobile device and/or testing).

In some implementations, the portable key 400 may have various communication interfaces for interacting with mobile devices that use different interfaces. For example, the portable key may include a plurality of connectors and a user may select the connector that couples with a specific mobile device. In some implementations, the portable key may include an adapter. The adapter may couple with a first connector of the portable key and include a second different type of connector to allow the mobile device to be coupled to the second type of connector (e.g., when mobile device may not be capable of coupling with the first connector but may be capable of coupling with the second connector).

In some implementations, the portable key 400 may also allow location tracking. The portable key may determine the location of a coupled mobile device independently and/or via features of the mobile device (e.g., GPS of the mobile phone, etc.). For example, the portable key may include, for example, a GPS to allow a location of the portable key and/or coupled mobile device to be identified. The portable key may be capable of determining a location based on coupling to networks (e.g., cellular networks, wireless networks, wired networks, etc.). In some implementations, the portable key may request the location of the mobile device (e.g., as identified by the mobile device, such as identified by the GPS or triangulation functions) and may store and/or transmit the location device of to the server.

The portable key 400 may be designed to custom fit a specific mobile device (e.g., phone model) and/or may be designed to work with a plurality of mobile devices, in some implementations. For example, the portable key may have a shape and/or size to couple with a specific mobile device and/or multiple types of mobile devices. The screen protector of the key may have a size and/or shape to couple with one or more types of mobile devices and/or ranges of mobile devices (e.g., ranges of screen sizes).

The connector 420 may be any appropriate communication interface of the portable key 400. The connector 420 may include adapters, such as one or more dongles, to connect the key to various types of mobile devices, in some implementations. For example, connector 420 may include a micro-USB connector, a lightning connector, a 30-pin connector, and/or other types of connectors to allow for a physical connection between the portable key 400 and a mobile device. As illustrated, the portable key 400 may include a small USB portable key that has the appropriate connector 420 to cover a predetermined set of mobile devices (e.g., common mobile devices manufactured in the past few years). For example, the connector 420 may have connectors for iPhone (30-pin, lightning) and/or Android (Micro/mini USB) mobile devices.

As illustrated, the indicator 430 may be a light emitting diode (LED) and/or other indicator that indicates the charge level of a power supply, such as a battery, in the portable key 400. For example, the indicator 430 may shine green when the charge level is above 80%, yellow when the charge level is 40-79%, and red when the charge level is below 40%. The indicator 430 may also be used to indicate other statuses of the portable key 400. For example, predetermined patterns of flash(es) or color(s) may indicate operations, such as whether a connection has been established with the mobile device (e.g., being traded in), whether data is being received, whether data is being transmitted, whether data is being saved to a memory of the portable key, whether a connection with a warehouse server has been established, and/or other statuses of the portable key 400.

As illustrated, in some implementations, the portable key may include a second communication interface. The charging/data port 440 (e.g., a second communication interface) may be used for charging the portable key 400 and/or for data transfer between a mobile device and a server (e.g., an in-store server or warehouse server). For example, the battery 450 may be charged by an external power source via the charging port 440 and may in turn charge (by acting as a power source) the mobile device to which the portable key 400 is plugged, in some implementations. In some implementations, the battery 450 may receive power from an attached mobile device when the mobile device is turned on and/or has sufficient power. The battery 450 may switch to charge the mobile device once its power drops below a predetermined threshold (e.g., 25%, below 25%, at a minimum value needed for operations at the warehouse, at a minimum value for operations needed for testing and/or other operations of the key).

In some implementations, the portable key 400 may include a wireless interface to communicate with other network servers such as a Configuration, Diagnostic and Data Management (CDDM) server. The wireless interface may include Bluetooth, Wi-Fi, mobile network, any other appropriate wireless interface, and/or combinations thereof.

Figure 2:
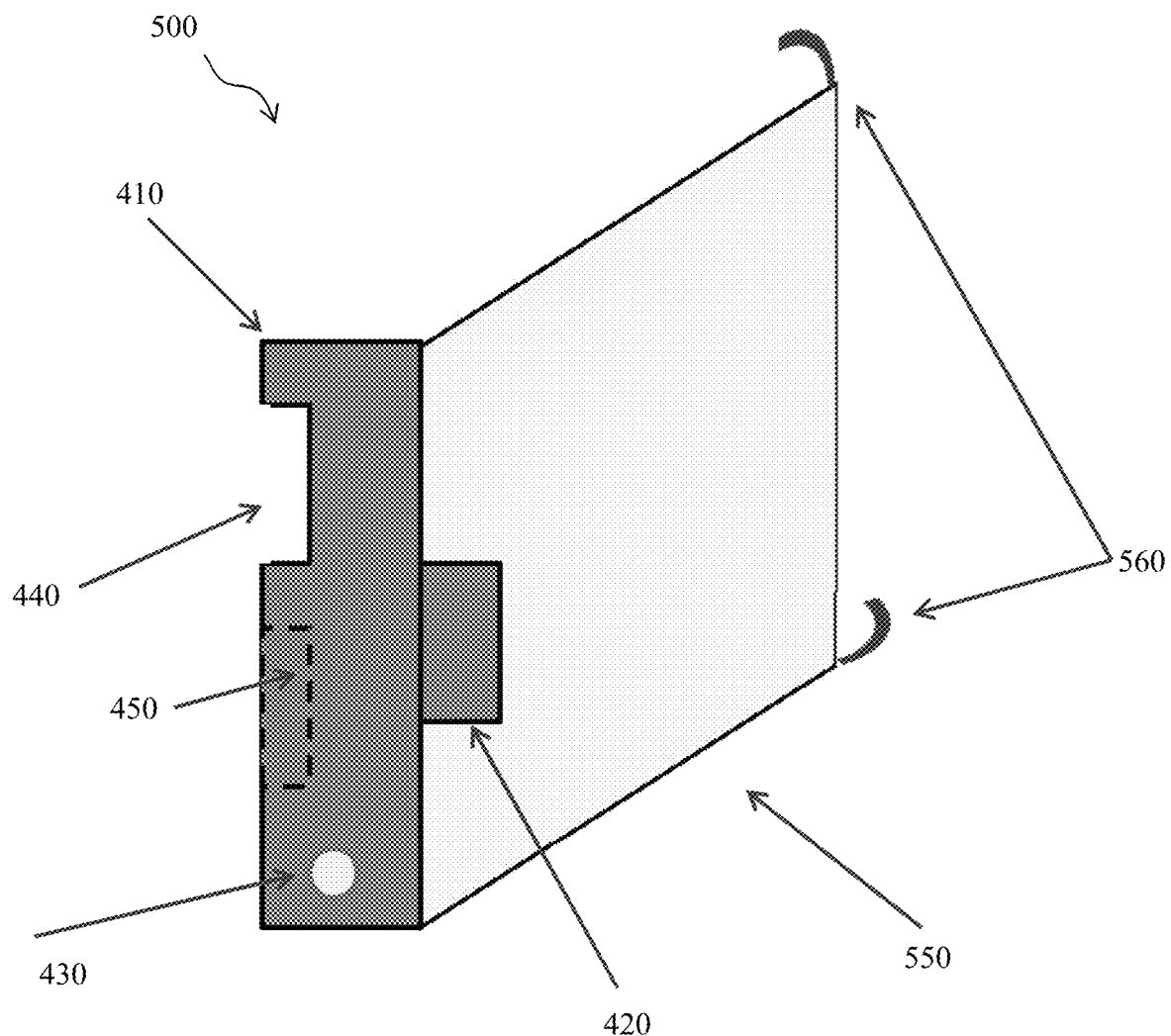
FIG. 2 illustrates an implementation of an example implementation of a portable key that includes screen protection.

FIG. 2 illustrates an implementation of a portable key 500 that includes a screen protector. The portable key 500 includes a housing 410, a connector 420, an indicator 430, and a dual use charging/data port 440. The portable key 500 includes a screen protection enclosure 550. The screen protector may include screen couplers, such as clamps 560, clips, bands, straps, and/or any other appropriate coupler. For example, the screen protector may include flexible clips to couple with a mobile device. In some implementations, the screen protector may include a Velcro strap that can be strapped around the device to secure the screen protector in a pre-determined position. The screen couplers may be designed to inhibit damage to the mobile device when coupling the screen couplers to the mobile device. For example, the screen couplers may include padding and/or non-marring arms. The screen protection enclosure 550 may include a screen flap (e.g., a planar and/or non-planar member) that covers and protects a mobile device screen. For example, the screen flap may be plastic (e.g., rigid and/or thin film), metal, and/or any other appropriate material. The screen flap or portions thereof may be transparent, translucent, and/or opaque. In some implementations, the opacity may be selected based on the desired function of the screen protector (e.g., to block visibility of the screen, to allow visualization of the screen, etc.). The screen flap may resemble a cover of a device case, in some implementations. The clamps 560 may help secure the screen protection enclosure 550 on the mobile device during transportation, in some implementations. The screen protection enclosure 550 may help lock the mobile device for enhanced security. The screen protection enclosure 550 may be coupled to the mobile device in store (e.g., at the end of a trade-in transaction) and/or by the user prior to shipping the mobile device for trade-in, replacement, and/or repair.

Figure 3:
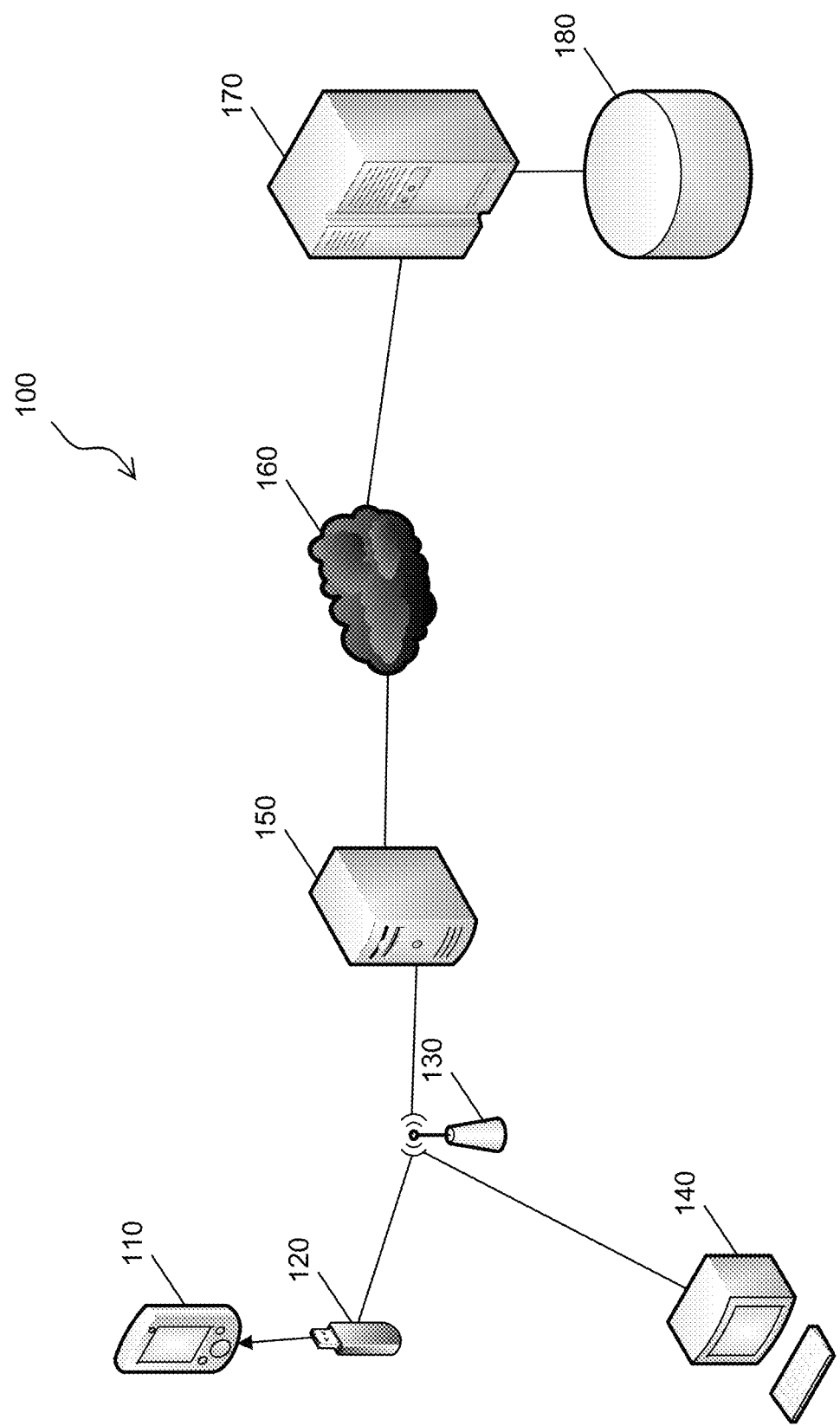
FIG. 3 illustrates an implementation of an example implementation of a partial system for trade-in or return operations using a portable key at a store.

The portable key may be utilized in a variety of applications. For example, the portable key may be utilized to facilitate trade-in, return, exchange, warranty, and/or recycling of a mobile device. FIG. 3 illustrates an implementation of an example system 100 for trade-in, repair, and/or return operations using a portable key 120 (sometimes referred to as a key portable key). A mobile device owner may return or trade in a mobile device 110 at a trade-in facility (e.g., a store, a kiosk, or at a device owner's home). The mobile device 110 may be physically connected to a portable key 120 at the trade-in facility via a port of the mobile device. The port of the mobile device may include any appropriate connector that allows data transfer such as a USB data port, lightening connector, mini HDMI port, and/or any other appropriate bus. The port of the mobile device may include female and/or male connector(s). The portable key 120 may retrieve mobile device information (e.g., identification information, usage information, service provider information, user information, operational information, component information, and/or any other appropriate information) via the port of the mobile device 110 and/or request operations be performed by the mobile device. For example, the key may be capable of generating instructions that are transmitted to the device to perform operations. The key may generate the instruction and transmit the instruction to the device via the connection. The device may receive the information and perform one or more operations based on the instructions. For example, the device may retrieve information, determine information (e.g., location), download applications, allow applications to operate, and/or any other appropriate operation. Operations may include retrieving mobile device information (e.g., IMEI, usage information, self-diagnostic information, repair history, carrier information, etc.). Operations may include, as described in U.S. patent application Ser. Nos. 15/452,707; 14/519,657; and 14/530,594: performing tests such as diagnostic tests to determine whether components are operational determining whether repair is feasible; determining lag times in repairable components, determining whether repair is economical (e.g., worth the cost and/or delay of repair), etc.

The portable key may be capable of communicating via a second communication interface with a warehouse server 150 (e.g., via Internet, Intranet, and/or other networks). The portable key may transmit at least a portion of the device information to the warehouse server 150. For example, as illustrated, the portable key 120 may transmit the information, via a wireless access point 130, to a POS (e.g., commercially available point of sale system and/or device) device 140 and/or a warehouse server 150. The warehouse server 150 may a server located at a location and/or more than one server working in conjunction (e.g., cloud based network, etc.) For example, the warehouse server 150 may be implemented as an in-store trade-in server that provides information about the mobile device 110 to a backend server 170 via a network 160 (e.g., the Internet) and/or may be combined with the backend server. The information may be stored in memory coupled to the warehouse server 150 and/or backend server 170, such as database 180.

After accessing mobile device information from the mobile device 110, the backend server 170 may provide a trade-in value of the mobile device 110 to the server 150 and/or to the POS device 140. The trade-in value of the mobile device may be performed by commonly utilized trade-in value algorithms and/or trade in value operations such as the operations described in U.S. patent application Ser. No. 14/519,657. The backend server 170 may determine the trade-in value by retrieving stored data from the backend database 180 related to devices (e.g., make and model) similar to that of the mobile device 110 being traded in. The device user may trade in the mobile device 110 at the value communicated via the trade-in server 150.

In some implementations, the portable key 120 may receive operations from the server 150 (e.g., via the Internet) and transfer at least a portion of the operations to the mobile device 110 via connection between the connector of the portable key and the port of the mobile device. The operations may be in any appropriate format, for example, the format may be selected based on received device information (e.g., mobile device type, OS, etc.). The operations may perform one or more tests which may facilitate processing of the mobile device 110, for example for return or trade-in. For example, the one or more of the operations may be transfer content stored on the device or a memory coupled to the device (e.g., cloud storage associated with the device), allow execution of tests (e.g., diagnostics tests), install/uninstall application(s), execute application(s), erase/wipe data from the device, backup content on the device or a memory associated with the device, allow restore functions based on the content retrieved from the device or another device, and/or any other appropriate operation. In some implementations, the key may utilize the communication capabilities of the device. For example, the key may cause the device to transmit data to the warehouse server and/or receive data from the warehouse server. In some implementations, the key may utilize cellular data access via the device, such as a mobile device, to send and/or receive data. In some implementations, the key may have the capability to receive and/or transmit data independently of the mobile device.

In some implementations, after information is retrieved by the portable key and/or at least partially transmitted to a server associated with the portable key (e.g., warehouse server 150), the portable key may be disconnected.

In some implementations, the portable key may remain coupled to the mobile device after retrieving device information and/or transmitting at least a portion of the received device information. After the mobile device 110 is traded in, the portable key 120 may remain connected to the mobile device 110. For example, at the trade-in location, a second portable key (not pictured) may be connected to a second mobile device (not pictured) (e.g., a mobile phone associated with the same user). The portable key 120 may retrieve user data (e.g., user contacts, application list, and/or setting information) from the used mobile device 110, and transmit the data to the second portable key to allow the data to be "restored" on a different device on the new mobile device. In some implementations, a portable key 120 may include more than one connector to allow more than one mobile device to be coupled together via the portable key. In some implementations, the data may be transformed to allow the data to be useable on a device with a different operating system and/or different applications (e.g., the portable key independently and/or in conjunction with the warehouse server may convert the data into a form usable by the second mobile device). Data may be transferred by one or the mobile devices to one or more other connected devices via the portable key. Allowing data residing on a mobile device to be transferred to another device may encourage device trade-in and/or purchase of new devices, which may increase profitability to the company and consumer satisfaction.

Figure 4:
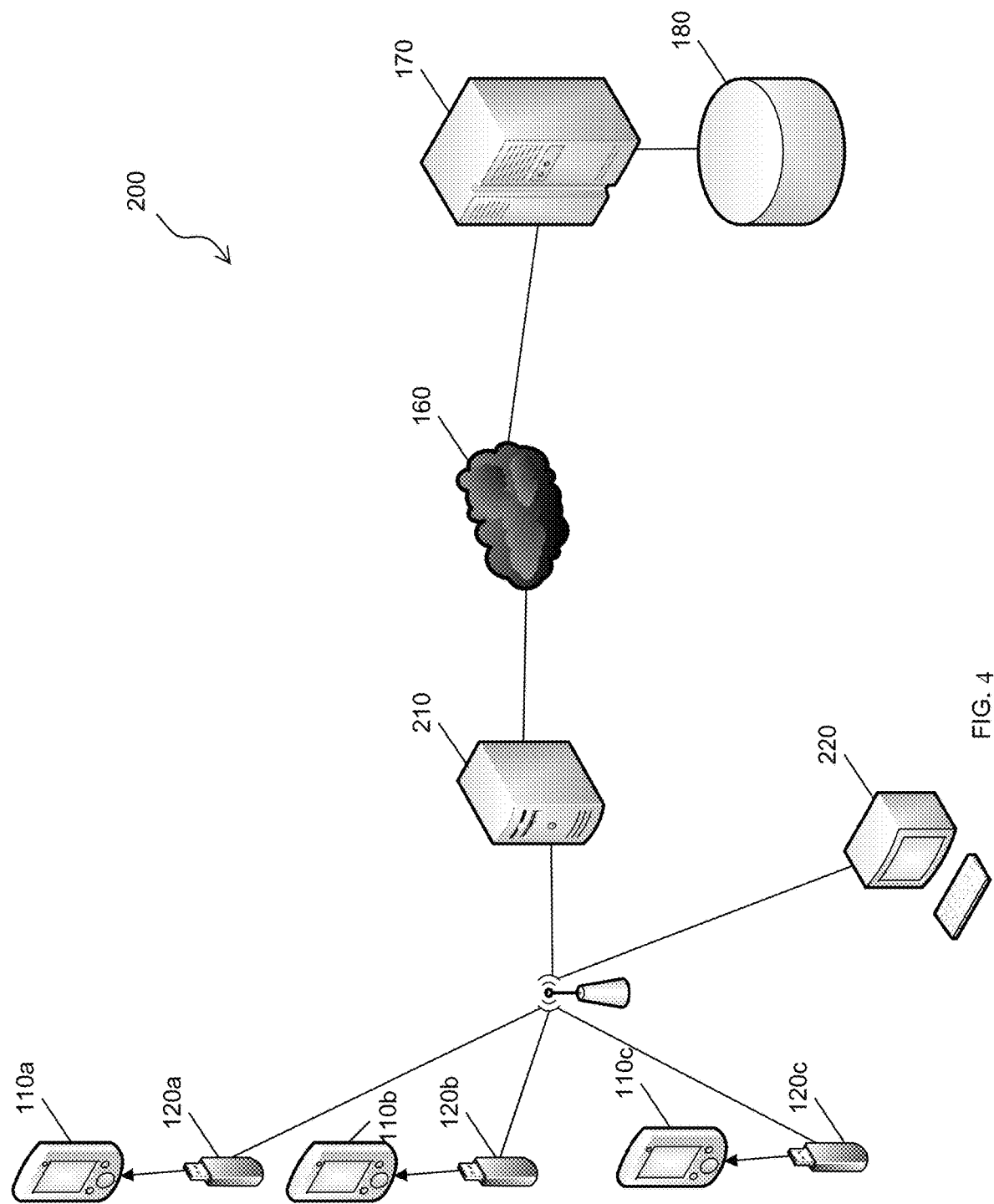
FIG. 4 illustrates an implementation of an example implementation of a partial system for receiving a mobile device return or trade-in at a warehouse.
Figure 5:
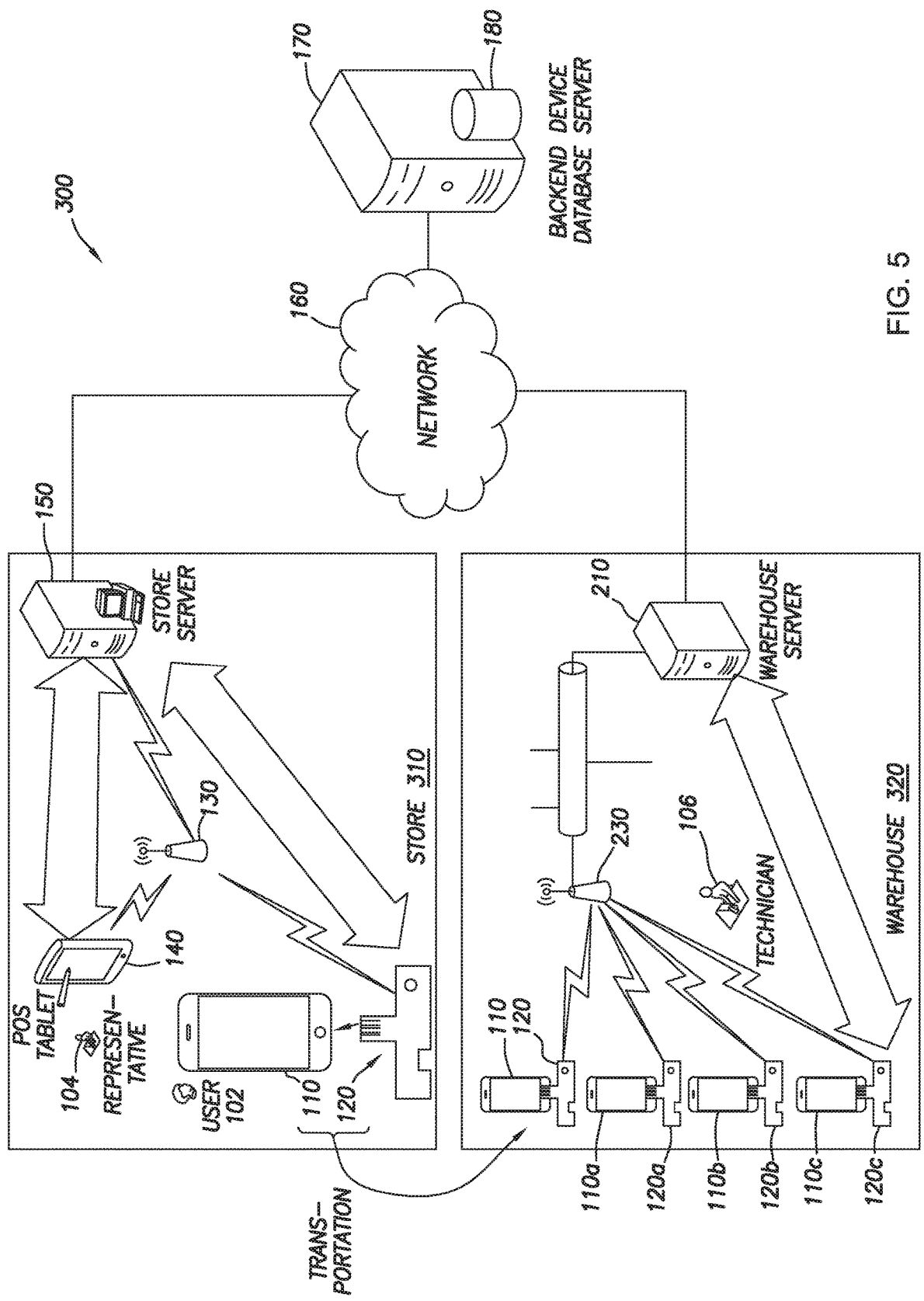
FIG. 5 illustrates an implementation of an example implementation of an overall system for mobile device trade-in processing.

In some implementations, the portable key may remain coupled to the mobile device to facilitate processing. For example, the portable key may facilitate identification of the mobile device, confirmation of a specific mobile device, verify identify of the mobile device, and/or lock the mobile device. FIG. 4 illustrates an implementation of an example system 200 for processing mobile devices (e.g., returned and/or trade-in) using portable keys. Several mobile devices 110a, 110b, and 110c, may be received at a warehouse facility that processes mobile devices. The mobile devices 110a, 110b, and 110c may each have a portable key 120a, 120b, and 120c coupled (e.g., a connector of a portable key may be directly coupled to a port of the mobile device). The portable keys 120a, 120b, and 120c may be coupled to the mobile devices 120a, 120b, and 120c at a trade-in facility prior to shipment to the warehouse, in some implementations. The portable keys may be communicably coupled to a warehouse server 210. For example, the portable keys 120a, 120b, and 120c may establish a communication link with the warehouse network via a wireless access point 230. The portable keys 120a, 120b, and 120c may provide information (e.g., device information and/or test results) to warehouse server 210. For example, a portable key may transmit information (e.g., device information) indicating that the mobile devices 110a, 110b, and 110c have arrived at the warehouse facility and are ready for processing. In some implementations, a technician may use a POS device 220 and/or any other appropriate device to retrieve information from the portable key and transmit at least a portion of the retrieved information to the warehouse server 210. In some implementations, the warehouse server 210 may directly communicate with the portable keys 120*a*, 120*b*, and 120*c* to perform analysis and/or maintenance of the mobile devices 110*a*, 110*b*, and 110*c*. The warehouse server 210 may interact with the servers 150 and/or 170 to provide information related to the mobile devices 110*a*, 110*b*, and 110*c*. For example, the warehouse server 210 may indicate the location of the mobile devices 110*a*, 110*b*, and 110*c*, the condition of the mobile devices 110*a*, 110*b*, and 110*c*, and other information related to the mobile devices 110*a*, 110*b*, and 110*c*. In some implementations, the backend server 170 may store the information in the backend database 180.

FIG. 3 is a schematic diagram showing an implementation of an example system 300 for mobile device trade-in processing. The system 300 may be considered a streamlined integration of the systems 100 and 200. In some implementations, a portable key may be used in various ways. A user 102 may trade in a user mobile device 110, for example, physically in a store 310 and/or via mail. The portable key 120 may be a portable key that a sales representative 104 can easily carry around (e.g., a small stick).

In some implementations, a sales representative 104 may reuse a portable key. For example, after receiving and/or transmitting device information and/or test results, the sales representative may unplug the portable key 120 from the mobile device 110 and retain the portable key 120 for subsequent use on other devices. The portable key may be reset (e.g., by activating an activator on the key and/or via software command) between uses, in some implementations.

In some implementations, a set of portable keys may be utilized to transmit data between devices. For example, in the store 310, a pair of portable keys may be used on two mobile devices. The first mobile device may be an old device that is being traded-in, the second mobile device may be a new mobile device that the user is purchasing. The pair of portable keys may interact to transfer user data from the old mobile device to the new mobile device. The portable keys may be capable of communicating with each other. Since some information may be restricted from being accessed and/or transferred by wirelessly coupled and/or otherwise indirectly coupled devices, the portable key may have access to and/or be capable of performing operations due to the physical coupling to the device that would otherwise be restricted.

In some implementations, the mobile device 110 may be shipped or transported from the store 310 and/or from another location, such as the user's home, to a warehouse 320. The warehouse 320 may be a final destination or a transient station for the mobile device. A mobile device may arrive with or without a portable key coupled to the mobile device. For example, the warehouse 320 may be a first receiving station, where a portable key may be plugged into the mobile device 110. The portable key, coupled to the mobile device, may facilitate various stages of processing, for example, until the mobile device 110 has been assigned to the disposition location.

In some implementations, the portable key may be utilized to verify the identity of the device (e.g., mobile device). For example, data from the portable key may be transmitted (e.g., by key and/or by device operations directed by the key) and compared to data received from the device when it arrives at the warehouse. The identity of the mobile device may be based on this comparison.

In an implementation, the portable key 120 may remain attached to the mobile device 110 during transit to the warehouse 320. In some implementations, the coupled mobile device and portable key may be transported in a secure manner (e.g., such that the portable key and mobile device are inhibited from inadvertent coupling). The portable key may be designed to inhibit inadvertent removal during transport. For example, the portable key may be locked to the mobile device. The lock may be a physical and/or virtual lock that inhibits access to the mobile device. For example, the portable key may download an application onto the mobile device that restricts use of the mobile device until a predetermined event (e.g., entry of a code, receipt of a command from the warehouse server, etc.). In some implementations, the portable key may lock the mobile device by altering a passcode (e.g., alphanumeric code, finger print code, and/or other code associated with native applications on the mobile device) of the mobile device to restrict access until the passcode is provided by a user. The passcode may be generated by the portable key and/or warehouse server. The passcode may be transmitted to the warehouse server when provided by the portable key or other source. In some implementations, authorized personnel such as a technician 106 at the warehouse 320 may be authorized to physically unlock the portable key 120 and/or allow use of the mobile device 110 (e.g., allow mobile device to be operational again). In some implementations, the mobile device 110 may be "virtually" locked (e.g., access to the data on the mobile device may be restricted) in the store 310. For example, the key may lock the device using operations of the mobile device (e.g., password locking native to the operating system, by downloading new application(s) to the device, etc.). In some implementations, the key may change the pass code utilized to access to the device. The virtual lock may remain virtually locked even if the portable key 300 is forcibly or accidentally removed during transit, in some implementations. For example, the key may down load a lock application on the mobile device, utilize a lock application, and/or be capable of performing operation(s) of the lock application. The lock application may determine the location (e.g., via device components and/or key components such as GPS) and transmit the location (e.g., to the warehouse server). As a mechanism to deter theft and tampering, physical and/or virtual unlocking may be required to make the mobile device fully operational again at the warehouse 320, in some implementations.

In some implementations, identification and/or tracking of a portable key may be managed by a CDDM server (e.g., the CDDM server may be capable of managing locations of multiple devices, transmitting and/or receiving signals from multiple devices, etc.) Both the store server 150 and the warehouse server 210 may be implemented as CDDM servers. The CDDM server can manage multiple portable keys (e.g., portable keys 120, 120*a*, 120*b*, and 120*c*) in various states of activity at the same time. The CDDM server may identify and track the activity and state of each plugged-in or idle portable key when the portable key is connected to the appropriate wireless network. The CDDM server can also designate a portable key as a source and optionally another portable key as a target to perform secure wireless data transfer. Results may be displayed on a POS system that the representative 104 is sharing live with the user 102. Alternatively, a connection between the portable key 120 and a target device can be a wired USB for more secure data transfer.

A portable key (e.g., any of the portable keys 120, 120a, 120b, and 120c) may be configured to stay in and transition between various modes such as sleep, wake, power save, etc. The portable key may automatically connect to a warehouse Wi-Fi network when received on the pallet if there is enough charge remaining to facilitate an automated receipt confirmation of the device. The automated processing may lead to faster release of online customer funds if needed.

A portable key (e.g., any of the portable keys 120, 120a, 120b, and 120c) may install temporary apps (for diagnosis, testing, data wiping, valuation, data transfer, etc.) into a mobile device as needed. This operation may be driven by an in-store or cloud server interaction as a "sideload" operation. The server application can also command the app to be uninstalled from the mobile device by communicating appropriately with the portable key.

A portable key (e.g., any of the portable keys 120, 120a, 120b, and 120c) may receive commands from a CDDM server and execute those commands over the physical USB channel with the mobile device. These commands may be used for device content transfer, diagnostics execution, application install/uninstall, app execution, data content wipe, device content backup and restore, or other suitable services, or combinations thereof.

In an implementation, the store server 150 may be an in-store or cloud server accessible on the network. The portable key 120 is a communication device that facilitates a USB-like communication between the server 150 and the mobile device 110 but over a wireless network (e.g., Bluetooth or Wi-Fi). The portable key 120 may be a translator of commands and requests for information from the server 150 to the mobile device 110. To the mobile device operating system (OS), the portable key 120 may be similar to a physically hardwired USB cable once plugged into its appropriate USB communication port. Accordingly, the secure connection allows for higher-privileged commands and information requests, which would otherwise be prohibited by the mobile device OS over a directly enabled wireless (e.g., Bluetooth or Wi-Fi) connection from the mobile device 110.

In an implementation, the POS device 140 may be setup in the store 310. The POS device 140 may be implemented as a fixed or mobile system (such as touchpad) with a display. The store representative 104 or the user 102 may be able to drive the POS device 140 and see the results of actions conducted by the server 150 on the portable key 120 and the attached mobile device 110. Therefore, the user 102 may run various commands (e.g., running diagnostics, retrieving key identification information, detecting OS lock status, wiping device content, etc.) by communicating with the mobile device 110 via the attached portable key 120 that's communicating with the server 150. The POS device 140 may reside on the same network as the portable key 120 and the server 150, but may also reside on another network as long as the POS device 140 and the server 150 are able to communicate.

In an implementation, the backend server 170 may comprise or be coupled to the backend database 180. The backend database 180 may store records of the mobile device 110 at various stages, e.g., from when the portable key 120 was first plugged into the mobile device 110, and after successful trade-in/turn-in at various transit points. The backend server 170 may record the state of the mobile device 110 as reported by the in-store or cloud server 150 over the network 160. The backend server 170 may also record the state of the mobile device 110 at other points in transit of the "locked" mobile device from the store 310 to the warehouse 320. When the mobile device 110 is received at the warehouse 320, the final check with automated and/or manual tests may still be facilitated by the portable key 120 plugged in the mobile device 110, thereby saving warehouse processing time. After warehouse processing, the portable key 120 may be unplugged, and the mobile device 110 may be physically and virtually unlocked to place the mobile device 110 into inventory for customer return or sale.

The present disclosure teaches a simplified process achieved by plugging in a store-owned and pre-configured portable key 120 to the mobile device 110 when the user 102 brings it in. After the plug-in, nearly all the rest of activities may be automatically handled by the POS device 140. For example, device identification, diagnostics, data transfer/ wipe operations may be conducted in-store when the device user 102 still has possession of the mobile device 110. Thus, the device user 102 may authorize various steps that need explicit authorization (such as data wipe) relatively quickly, reducing cost of time and resources.

In addition, since the portable key 120 can stay plugged into the mobile device 110 during transportation from the store 310 (or a home) to the warehouse 320, repetitive data gathering and processing may be reduced or eliminated. For example, when the mobile device 110 gets to the warehouse 320, the same portable key 120 may connect to a warehouse network and communicate with a warehouse system with a backend database, which may synchronize and verify the state of the mobile device 110 with the state captured at the earlier time of trade-in. After minimal manual verification steps, the portable key may be unlocked from the device along with the virtual "unlock" from the technician station for final quality assurance to go into inventory. The process of trade-in value adjustment and credits, if necessary, may also be done automatically with minimal input and effort by the technician 106.

FIG. 6 is a flowchart showing an implementation of a process 600 for returning or trading in a mobile device (e.g., any of the mobile devices 110 and 110a-110c) using a portable key (e.g., any of the mobile devices 120 and 120a-120c). The process 600 starts at action 610, where the process 600 may establish a wired connection between the mobile device and the portable key plugged into a data port of the mobile device. For example, a user may insert the connector of the portable key into a port of the mobile device. The mobile device may recognize the connection between the portable key and the mobile device and allow communication between the devices. Once the connection between the portable key and the mobile device is established, data may be transferred via the connection.

At action 620, the process 600 may establish a wireless connection between the portable key and a network device (e.g., the in-store server 150 or the warehouse server 210). At action 630, the process 600 may facilitate data transfer between the mobile device and the network device, e.g., by issuing commands from the network device to be executed on the mobile device, and by retrieving user data from the mobile device.

Still at action 630, in an implementation, the process 600 may direct the mobile device to perform one or more of the following operations: content transfer, diagnostics execution, application installation, application uninstallation, application execution, data content wiping (e.g., via functionality of the mobile device and/or server commands), data content backup, and data content restore. In some implementations, government and/or industry privacy guidelines may be followed during data handling. Some of the commands may render the mobile device inoperable unless the mobile device can later be unlocked by an authorized person. Further, at action 630 the process 600 may send, from the portable key to the network device, information regarding a plurality of the following items: usage time, device location, make, model, age, device identification information, user data such as contacts, operating system version, firmware version, battery life, frequency of keyboard usage, portable key ID, store location, store number, and representative ID.

In an implementation, the network device may be an in-store CDDM server (e.g., the server 150) coupled to a POS device (e.g., the POS device 140) operated by a sales representative. In this case, transferring the data between the mobile device and the in-store CDDM server comprises retrieving, from the mobile device, information regarding conditions (e.g., parameters discussed above) of the mobile device that impact a trade-in value of the mobile device. Further, at action 640, the process 600 may transmit, from the in-store server to a backend server, the information regarding conditions (e.g., usage, test results, etc.) of the mobile device. At action 650, the process 600 may determine, at the backend server, an estimated trade-in value of the mobile device based in part on the information regarding conditions of the mobile device and in part on trade-in records of other devices similar to the one in question. At action 660, the process 600 may transmit, from the backend server to the POS device via the in-store CDDM server, the estimated trade-in value of the mobile device. At action 670, the process 600 may display the estimated resale value on the POS device.

In an implementation, the mobile device may be a first, used mobile device. In this case, the process 600 may transfer user data from the first, used mobile device to a second, new mobile device. The user data transfer is facilitated by the network device coupled to both the first and second mobile devices. The user data may relate to a user associated with both the first and second mobile devices.

At action 672, the return or trade-in transaction may be completed at the store and the mobile device may be transported from the store to a second location such as a transit station or a warehouse. In an implementation, the portable key remains plugged in the data port of the mobile device during transportation of the mobile device from a first location (e.g., a store or a user's home) to a second location (e.g., a transit station or the final destination). The network device may be a first server at the first location. At action 680, the process 600 may transfer data from the mobile device to a second server (e.g., the warehouse server 210) at the second location. Further, at least part of the transferred data may be uploaded from the first and second servers to a backend server (e.g., the backend server 170) that tracks activities of the mobile device at multiple locations during the return or trade-in process 600.

At action 682, a technician at the second location may validate an identity of the portable key. At action 684, the technician may unplug the portable key based upon validation of the identity of the portable key. At action 686, the technician may transition the mobile device from an inoperable mode to an operable mode.

Depending on the implementation, the process 600 may include various other steps. For example, the process 600 may charge the mobile device, by the portable key, via the wired connection, may indicate a power status of the portable key using a LED, and may protect a screen of the mobile device using a screen protection enclosure located on the portable key.

FIG. 7 is a flowchart showing another implementation of a process 700 for returning or trading in a mobile device using a portable key. The process 700 starts at action 710, where a store representative may plug in a portable key into a mobile device that a user has brought for return or trade-in. Alternatively, if the user initiates the return/trade-in at home, the user may plug in the portable key and ship from home. At action 720, the portable key may automatically send to a network device (e.g., an in-store server or a backend server) basic information of the mobile device such as the ID of the portable key, mobile serial number (S/N), IMEI, location, store information, results of basic Diagnostics, etc. At action 730, the portable key may transfer commands to install various applications on the mobile phone. Example applications may include those for value check (trade-in or return value which may be determined by a backend server and displayed on a POS device), content transfer (from the source to a destination device), diagnostics check which may be user interactive, an data wipe (after which the app may be re-installed as it is plugged in). In some implementations, the key may initiate the device downloading of the app via its own network capabilities and/or the key may store and transmit the app to the device.

At action 740, the store representative may use a POS device to complete the in-store transaction of the return or trade-in. The store representative may validate the transaction and complete payment. At action 750, the mobile device may be shipped to a warehouse with the device being rendered inoperable (e.g., in a sleep mode, locked mode, and/or being turned off). In some implementations, the portable key may remain plugged in the mobile device on its way to the warehouse. At action 760, the mobile device may arrive at the warehouse with the portable key still plugged in. At action 770, a technician at the warehouse may receive the mobile device and validate the identity of the portable key. For example, the technician may perform a command (e.g., wave up) the mobile device and trigger an administrative mode. The mobile device may interface with a warehouse server via the portable key. The technician may use a screen on the mobile device to execute steps, and for quality control, may validate the identity of the portable key before unplugging the portable key from the mobile device. At action 780, the mobile device may be reset as clean and be placed in inventory for resale or other purposes. In some implementations, the key may cause the device to wipe itself (e.g., delete data) and/or the key may transmit instructions to the device that when performed wipe the data.

Described processes may be implemented by various described systems, such as systems 100, 200, 300. In addition, various operations may be added, deleted, and/or modified. In some implementations, process(es) may be performed in combination with other processes such as process and/or operations thereof. In some implementations, the key may directly communication with one or more other components of the system (e.g., rather than via the in-store servers.

In various implementations, a key (e.g., portable key) may include a housing and a connector. The housing may include a first communication interface adapted to communicate with a warehouse server; a processor adapted to retrieve data from a device coupled to the key and/or transmit at least a portion of the received data to the warehouse server; and/or a power source capable of providing power one or more components of the housing. The connector may directly coupling with a port of a device to communicate with the device. The device may be a mobile device.

Implementations may include one or more of the following features. The connector may include a male connector and the port of the mobile device comprises a female connector. The processor of the key may perform one or more tests, receive results of the operation from the mobile device, and transmit at least a portion of the results to the warehouse server. Test(s) may cause the mobile device to perform an operation. The processor of the key may determine that the mobile device is coupled to the portable key via the connector. If a determination is made that the mobile device is coupled to the portable key, the key may communicably couple to the warehouse server and/or retrieve one or more tests to perform on a coupled mobile device. In some implementations, retrieved test(s) may be performed, and results of the test(s) may be received. Test(s) may cause the mobile device to perform an operation. Test(s) may include any appropriate test to diagnose operability of the mobile device and/or components thereof. For example, tests may determine if a speaker, haptic, GPS, connector, data connectivity component, and/or touch screen are broken (e.g., by causing use of the component and determining whether the appropriate response was received from the user and/or as detected by the mobile device and/or key). In some implementations, tests may include operations described herein and/or in patent applications incorporated herein, and/or any other appropriate test. At least a portion of the results may be transmitted to the warehouse server. In some implementations, the test result(s) may be stored on a memory of the key. The key may include indicator(s) to provide notifications. For example, an indicator may provide one or more visual notifications, when at least one of power sources of the key is charging, testing status, and/or communication with warehouse server. The key may include a memory that is capable of storing results received from the mobile device and/or data retrieved from the mobile device. The key may include a screen protection enclosure that at least partially covers a screen of the mobile device. The screen protection enclosure may include one or more clamps for securing the portable key onto the mobile device. The housing may allow the mobile device coupled to the portable key to rest on the housing, in some implementations. The key may include a battery configured to provide power to the mobile device via the first communication interface. The key may include an indicator configured to indicate a power status of the battery. The connector of the key may remain plugged into the port of the mobile device during transportation of the mobile device from a first location to a second location, and the first communication interface may transfer data from the mobile device coupled to the portable key to a server at the second location. The portable key may include a lock (e.g., physical and/or virtual) capable of locking the portable key to the mobile device. Activation of the lock may inhibit operation of the mobile device during the transportation of the mobile device from the first location to the second location. The lock may be removable (e.g., capable of unlocking the portable key from the mobile device to allow the mobile device to be operational). The key may wirelessly couple to a server at a location and/or notify the server of the arrival of the mobile device at the location. The connector may be unplugged from the port of the mobile device after an in-store return and/or trade-in transaction of the mobile device is complete, and wherein the connector is further configured to be plugged into a second data port of a second mobile device for at least one of a different in-store return or a different trade-in transaction. The key may (e.g., via instructions performed by the processor) be capable of directing the mobile device to perform at least one of content transfer, diagnostics execution, application installation, application uninstallation, application execution, data content wiping, data content backup, and data content restore, and wherein the data retrieved from the mobile device comprises information regarding one or more of the following parameters: usage time, device location, make, model, age, device identification information, user data such as contacts, operating system version, firmware version, battery life, and/or frequency of keyboard usage. The key (e.g., via instructions performed by the processor) be capable of requesting restricted information. The mobile device may be inhibited from transferring the requested restricted information over a wireless connection. At least a portion of the restricted information may include information for value assessment of the mobile device. The key may receive commands from the warehouse server via the first communication interface. For example at least one of the commands received may be executed on the mobile device to render the mobile device inoperable unless the mobile device is unlocked.

In some implementations, a trade-in value of the coupled device may be determined at least partially by the key (e.g., via an application downloaded on the mobile device and/or on the warehouse server). Information about the mobile device may be retrieved from the mobile device by the key. Additional information such as sales prices for similar mobile devices, future sales price predictions, market supply, market conditions, lags in repair time and/or component availability, availability of newer models, release dates of newer models, online reviews regarding the durability of the mobile device, and/or other factors that might influence trade-in value may be retrieved. The trade-in value may then be determined based on the mobile device information and additional information (e.g., a base value may be determined based on sales prices for similar models and the additional information may be used to adjust, up or down, the value).

In various implementations, receipt of devices may be facilitated using the key. A device and a portable key may be coupled by inserting a connector of the portable key into a port of the device. The portable key and a warehouse server may be communicably coupled. Instructions may be transmitted to the device via the coupling between the connector of the portable key and the port of the device to cause one or more operations to be performed on the device, and mobile device information may be received from the device based on operations requested by a processor of the portable key. The device may be a mobile device.

Implementations may include one or more of the following features. Trade-in information may be determined based at least partially on the received mobile device information. Test(s) to be performed on the mobile device may be received from the warehouse server, and/or the received test(s) may be requested, via the portable key, to be performed on the mobile device coupled to the portable key. In some implementations, the mobile device may be charged, via the power source of the portable key, and/or a power status of the portable key and/or device may be provided using an indicator. A screen of the mobile device may be protected (e.g., damage may be inhibited) by coupling a screen protection enclosure of the portable key to the coupled mobile device. In some implementations, a second mobile device may be coupled to the portable key, and at least a portion of the received device information (e.g., received from prior coupling to a first device) may be transmitted from the first mobile device to a second mobile device via the portable key. In some implementations, the network device is an in-store Configuration, Diagnostic and Data Management (CDDM) server coupled to a Point of Service (POS) device operated by a sales representative, and transferring the data between the mobile device and the in-store CDDM server includes retrieving, from the mobile device, information regarding conditions of the mobile device that impact a trade-in value of the mobile device. The information regarding conditions of the mobile device may be transmitted, from the in-store server to a backend server. An estimated trade-in value of the mobile device may be determined, at the backend server, based in part on the information regarding conditions of the mobile device, and the estimated trade-in value of the mobile device may be transmitted (e.g., from the backend server to the POS device via the in-store CDDM server). The estimated resale value may be presented on the POS device, in some implementations. In some implementations, at least a portion of the device information may be transmitted (e.g., transferred) from the mobile device and the network device via the portable key. Transferring at least a portion of the device information may include requesting, via the portable key, the mobile device to perform: content transfer, diagnostics execution, application installation, application uninstallation, application execution, data content wiping, data content backup, and/or data content restore. The device information may include usage time, device location, make, model, age, device identification information, user data such as contacts, operating system version, firmware version, battery life, frequency of keyboard usage, portable key identifier (ID), store location, store number, and/or representative ID. In some implementations, the mobile device may be locked by issuing one or more commands to be executed on the mobile device for rendering the mobile device inoperable unless the mobile device is unlocked. The portable key may remain plugged in the data port of the mobile device during transportation of the mobile device from a first location to a second location. Data may be transferred from the mobile device to a second server at the second location. An identity of the portable key and/or mobile device may be validated, the portable key may be uncoupled and/or unlocked based upon validation of the identity of the portable key, and the mobile device may be transitioned from an inoperable mode to an operable mode.

In various implementations, a backend server system may include a server and a database. The server may track activities of a device during a return or trade-in process of the device by retrieving data from the device for a plurality of times at a plurality of locations including first at a store and then at a warehouse. The database may store the data retrieved from the device. Retrieving the data from the device may include using a portable key attached (e.g., directly coupled) to the device at the store via a wired connection. The portable key remains attached to the device during transit from the store to the warehouse. The device may include a mobile device.

In some implementations, the data retrieved from the mobile device at the store may include information that affects a trade-in value of the mobile device. The server may determine a trade-in value of the mobile device at the store based on information stored in the database.

Although examples of devices that may be used with the disclosure have been described, the various devices (e.g., warehouse server) can be implemented through one or more computers such as servers, as well as a server pool. A computer may include a general-purpose personal computer (PC) a Macintosh, a workstation, a UNIX-based computer, a server computer, or any other suitable device. According to one implementation, a device may include a web server. A device may be adapted to execute any operating system including UNIX, Linux, Windows, or any other suitable operating system. The device may include software and/or hardware in any combination suitable to provide access to data and/or translate data to an appropriate compatible format.

Although specific components of the portable key have been described, the components may include any appropriate computer or other programmable logic device. The portable key may include a processor that executes instructions and manipulates data to perform operations of the key. A processor may include a programmable logic device, a microprocessor, or any other appropriate device for manipulating information in a logical manner and memory may include any appropriate form(s) of volatile and/or nonvolatile memory, such as RAM and/or Flash memory. In addition, various software (e.g., instructions to allow performance of operations) may be stored on the memory of the key. For example, instructions (e.g., operating systems, modules and/or other types of software) may be stored on a memory the device. The module(s) of the key may include instructions to perform one or more of the operations described. In some implementations, modules may be combined, such as into a single module or multiple modules. Modules may include various modules and/or sub-modules.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable signal(s) may be non-transitory waves and/or non-transitory signals.

Various U.S. Patent Applications have been described herein and are fully incorporated herein to the extent that the teachings do not contradict the teachings of the present application. U.S. patent application Ser. Nos. 15/452,707; 14/519,657; and 14/530,594 are fully incorporated herein to the extent that their separate and combined teachings do not contradict the teachings of the present application Although various implementations describe a mobile device as a smart phone, a mobile device may include other transportable devices such as mobile telephones, personal digital assistants, electronic readers, wearables (e.g., smart watches and/or smart jewelry), digital recorders, tablets, laptops, other handheld devices, and/or any other portable computing device. Although various implementations describe a mobile device (e.g., coupling with the key), one or more of the described systems and/or processes may be utilized with other electronic devices (e.g., non-mobile programmable logic devices).

Although users have been described as a human, a user may be a person, a group of people, a person or persons interacting with one or more computers, and/or a computer system.

It is to be understood the implementations are not limited to particular systems or processes described which may, of course, vary. It is also to be understood that the terminology used herein is for the purpose of describing particular implementations only, and is not intended to be limiting. As used in this specification, the singular forms "a", "an" and "the" include plural referents unless the content clearly indicates otherwise. Thus, for example, reference to "a processor" includes a combination of two or more processors and reference to "a connector" includes different types and/or combinations of connectors.

Although the present disclosure has been described in detail, it should be understood that various changes, substitutions and alterations may be made herein without departing from the spirit and scope of the disclosure as defined by the appended claims. Moreover, the scope of the present application is not intended to be limited to the particular implementations of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding implementations described herein may be utilized according to the present disclosure. Accordingly, the appended claims are intended to include within their scope such processes, machines, manufacture, compositions of matter, means, methods, or steps.

What is claimed is:

1. A portable key comprising:
    a housing, wherein the housing comprises:
        a first communication interface adapted to communicate with a warehouse server wherein the warehouse server tracks activities of a mobile device during a return or trade-in process of the mobile device by retrieving data from the mobile device for a plurality of times at a plurality of locations including a first location and then at a warehouse;
        a processor, wherein the processor is adapted to:
            retrieve data from the mobile device coupled to the portable key;
            transmit at least a portion of the received data to the warehouse server;
            perform one or more tests, wherein at least one of the tests is capable of causing the mobile device to perform an operation;
            receive results of the operation; and
            transmit at least a portion of the results to the warehouse server; and
        a power source, wherein the power source provides power one or more components of the housing,
    wherein the portable key remains attached to the mobile device during transit from a store to the warehouse,
    wherein an application restricts access to the mobile device until receiving a command from the warehouse server to permit access to the mobile device; and
    a connector, wherein the connector is capable of directly coupling with a port of the mobile device to communicate with the mobile device.

2. The portable key of claim 1 wherein the connector comprises a male connector and wherein the port of the mobile device comprises a female connector.

3. The portable key of claim 1 wherein the processor of the portable key is further adapted to:
    determine that the mobile device is coupled to the portable key via the connector; and
    if a determination is made that the mobile device is coupled to the portable key:
        communicably couple to the warehouse server; and
        retrieve one or more of the tests to perform on a coupled mobile device; and
    perform one or more of the retrieved tests.

4. The portable key of claim 1 further comprising an indicator, wherein the indicator provides one or more visual notifications, wherein one or more of the visual notifications comprise at least one of power source charging, testing status, or communication with the warehouse server.

5. The portable key of claim 1 further comprising a memory, and wherein the memory stores at least one of: one of the tests, result received from the mobile device or data retrieved from the mobile device.

6. The portable key of claim 1 further comprising a screen protection enclosure configured to cover a screen of the mobile device, wherein the screen protection enclosure comprises one or more clamps for securing the portable key onto the mobile device.

7. The portable key of claim 1 wherein the housing allows the mobile device coupled to the portable key to rest on the housing; and further comprising:
    a battery configured to provide power to the mobile device via the first communication interface; and
    an indicator configured to indicate a power status of the battery.

8. The portable key of claim 1 wherein the connector is configured to remain plugged into the port of the mobile device during transportation of the mobile device from a first location to a second location, and wherein first communication interface is further configured to transfer data from the mobile device coupled to the portable key to a server at the second location.

9. The portable key of claim 1 wherein the processor is further adapted to perform operations comprising directing the mobile device to perform at least one of content transfer, diagnostics execution, application installation, application uninstallation, application execution, data content wiping, data content backup, and data content restore, and wherein the data retrieved from the mobile device comprises information regarding one or more of the following parameters: usage time, device location, make, model, age, device identification information, user data such as contacts, operating system version, firmware version, battery life, or frequency of keyboard usage.

10. A method to facilitate receipt of a mobile device, the method comprising:
    coupling a mobile device and a portable key by inserting a connector of the portable key into a port of the mobile device;
    communicably coupling the portable key and a warehouse server, wherein the warehouse server tracks activities of a mobile device during a return or trade-in process of the mobile device by retrieving data from the mobile device for a plurality of times at a plurality of locations including a first location and then at a warehouse;

transmitting instructions to the mobile device via the coupling between the connector of the portable key and the port of the mobile device to cause one or more operations to be performed on the mobile device;

receiving mobile device information from the mobile device based on operations requested by a processor of the portable key; and locking the mobile device by a lock application, wherein the portable key remains attached to the mobile device during transit from a store to the warehouse.

11. The method of claim 10 further comprising determining trade-in information based at least partially on the received mobile device information.

12. The method of claim 10 further comprising:

receiving one or more tests to be performed on the mobile device from the warehouse server; and requesting, via the portable key, one or more of the received tests to be performed on the mobile device coupled to the portable key.

13. The method of claim 10 further comprising:

charging the mobile device, via the power source of the portable key; and indicating a power status of the portable key using an indicator.

14. The method of claim 10, wherein the mobile device is a first mobile device, and further comprising:

coupling a second mobile device to the portable key; and transferring at least a portion of the received mobile information from the first mobile device to the second mobile device via the portable key.

15. The method of claim 10 wherein transferring at least a portion of the mobile information comprises requesting, via the portable key, the mobile device to perform at least one of: content transfer, diagnostics execution, application installation, application uninstallation, application execution, data content wiping, data content backup, or data content restore.

16. The method of claim 10, further comprising locking the mobile device by issuing one or more commands to be executed on the mobile device for rendering the mobile device inoperable unless the mobile device is unlocked.

17. A backend server system comprising:

a server configured to:

track activities of a mobile device during a return or trade-in process of the mobile device by retrieving data from the mobile device for a plurality of times at a plurality of locations including a first location and then at a warehouse;

issue a first command to the mobile device to lock to the mobile device; and issue a second command to the mobile device to unlock the mobile device when the mobile device is at the warehouse; and a database for storing the data retrieved from the mobile device, wherein retrieving the data from the mobile device comprises using a portable key attached to the mobile device at the first location via a wired connection, and wherein the portable key comprises a processor, wherein the processor is adapted to perform one or more operations to:

retrieve data from a mobile device coupled to the portable key;

transmit at least a portion of the received data to the server;

perform one or more tests, wherein at least one of the tests is capable of causing the mobile device to perform an operation;

receive results of the operation via the portable key; and transmit at least a portion of the results from the portable key to the server, wherein the portable key remains attached to the mobile device during transit from the store to the warehouse.

18. The backend server system of claim 17, wherein the data retrieved from the mobile device at the store comprises information that affects a trade-in value of the mobile device, the server further configured to determine a trade-in value of the mobile device at the store based on information stored in the database.

* * * * *

UNITED STATES PATENT AND TRADEMARK OFFICE
CERTIFICATE OF CORRECTION

PATENT NO. : 10,853,466 B2
APPLICATION NO. : 15/916246
DATED : December 1, 2020
INVENTOR(S) : Bikramjit Singh et al.

Page 1 of 1

It is certified that error appears in the above-identified patent and that said Letters Patent is hereby corrected as shown below:

In the Claims

Claim 1, Column 23, Line 60, the word -- to -- should be inserted between the words "power" and "one".

Claim 17, Column 26, at the end of Line 8, the word "to", following the word "lock", should be removed.

Signed and Sealed this
Thirtieth Day of March, 2021

Drew Hirshfeld
*Performing the Functions and Duties of the*
*Under Secretary of Commerce for Intellectual Property and*
*Director of the United States Patent and Trademark Office*